April 8, 1930.  O. U. ZERK  1,753,494
LUBRICATING SYSTEM
Filed Aug. 1, 1925
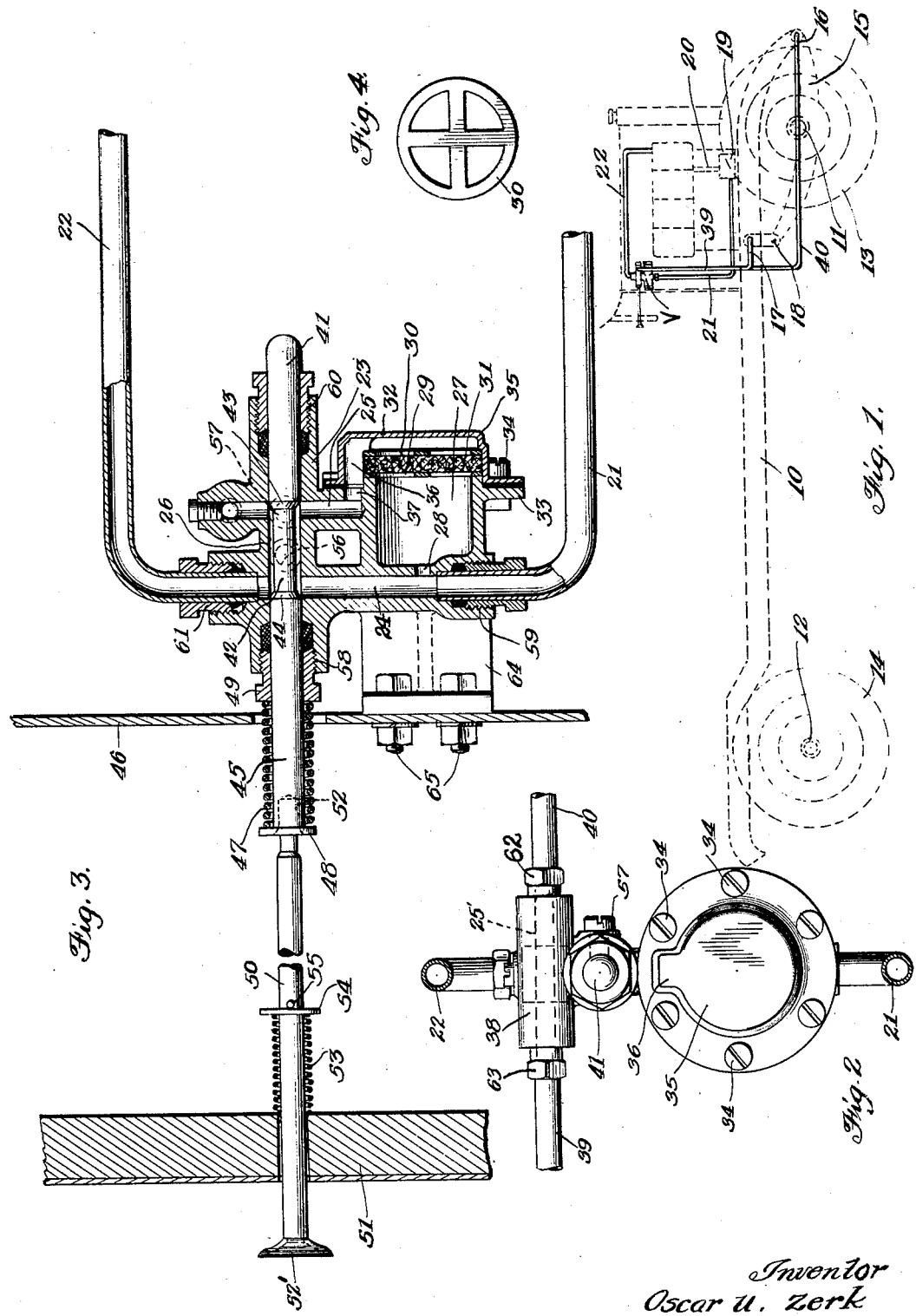
Inventor
Oscar U. Zerk
By Pierce & Sweet
Attys.

Patented Apr. 8, 1930

1,753,494

UNITED STATES PATENT OFFICE

OSCAR ULYSSES ZERK, OF CHICAGO, ILLINOIS, ASSIGNOR TO ALEMITE CORPORATION, OF CHICAGO, ILLINOIS, A CORPORATION OF DELAWARE

LUBRICATING SYSTEM

Application filed August 1, 1925. Serial No. 47,566.

My invention relates to improvements in lubricating systems, and is particularly concerned, though not necessarily limited, to the provision of a lubricating system for use upon automotive vehicles.

The objects of my present invention are:

First, to provide a novel type of lubricating system whereby a plurality of bearings can be lubricated as a result of a single effort on the part of the operator;

Second, to provide a lubricating system in which the lubrication of all the bearings is substantially simultaneously accomplished;

Third, to provide a lubricating system that may include a source of more or less dirty lubricant, common means being provided for removing the dirt from the lubricant;

Fourth, to provide a lubricating system for automotive vehicles in which the supply of lubricant is drawn from the crank case of the engine;

Fifth, to provide a lubricating system, such as described, comprising means for maintaining a substantially continuous circulation of the lubricant and other means for diverting a portion, or all, of the circulating lubricant and using it for lubricating the bearings;

Sixth, to provide a lubricating system, such as described, in which that portion of the lubricant that is supplied to the bearings passes through a filter; and Seventh, to provide a system, such as described, that is simple in construction, cleanly and easily assembled.

Other objects of my invention will appear as this description progresses, reference being had to the accompanying drawings, in which:

Figure 1 is a more or less diagrammatic view of a system embodying my invention, the chassis upon which the system is mounted being shown in dotted outline;

Figure 2 is a vertical view of the control valve and filter element;

Figure 3 is a vertical section through the control valve and filter element; and Figure 4 is a view of one of the spiders used to retain the filtering medium in place.

Throughout the several views similar reference characters are used for referring to the same parts, and the several sections are taken looking in the direction of the small arrows.

I have illustrated my invention as being applied to an automobile chassis comprising the side frame member 10 and the front and rear axles 11 and 12, respectively, that are supported by the wheels 13 and 14, respectively. The front axle 11 supports a spring 15 of conventional design that is connected with the frame member 10 by the usual shackle bolts 16, 17 and 18, respectively.

The engines or motors of nearly all motive vehicles are provided with lubricating systems embodying a pump, located at or near the bottom of the crank case, and which withdraws the oil from the crank case and forces it to the various bearings of the engine, the excess oil returning to the crank case. In my present system I propose to make use of a similar pump 19, driven from the shaft 20 that drives the conventional pump for oiling the engine. The pump 19 withdraws oil from the crank case and discharges it through the pipe 21 into the control valve and filtering unit that is indicated as a hole by the reference character V. Normally, that is, when lubrication is not being effected, the oil passes through the valve V and returns to any suitable point in the crank case through the conduit 22. The control valve comprises means for diverting some, or all, of the oil from this circulating stream of lubricant, filtering it, and directing it into the various chassis bearings.

The valve V comprises a body member 23 having the transversely extending bores, or passageways, 24 and 25 and the longitudinally extending passageway, or bore, 26 that intersects and communicates with the passageways 24 and 25.

The body member 23 has a filter chamber 27 formed therein, one end of which communicates with the bore 24 through the port 28, and the other end of which is closed by a filter element comprising the two spiders, or perforated stampings, 29 and 30 between which is clamped a layer 31 of felt, or other suitable filtering material. This filter element is clamped to the open end of the filter chamber 27 by means of the cap 32 that is preferably stamped from sheet metal and which is secured to a suitable flange 33 on the body member by means of the screws 34. The central raised portion 35 of the cap has a lateral extension 36 that extends over the opening 37 so as to establish communication between the bore 25 and the filter chamber 27. The construction just described constitutes, in effect, an enlargement of the passageway 25 having a filtering element therein for removing any dirt or other material held in suspension and depositing it in the filter chamber 27. It will also be seen that in effect the two bores 24 and 25 have a common inlet but separate discharge ports, the discharge port of bore 24 communicating with the conduit 22.

The body member 23 includes a T-shaped connection 38 having a bore 25' therethrough that communicates with and forms a part of the passageway 25. Conduits 39 and 40 lead from opposite ends of the T connection 38 to the front and rear shackle bolts 16 and 17, respectively.

For controlling the supply of lubricant to the bearings, I provide a reciprocating valve 41 that has the reduced portion, or check, 42 and the shoulders 43 and 44, respectively. This valve reciprocates in the bore 26 and has a valve rod, or valve stem, 45 that projects through the dash board 46. The valve is held in the position shown in Figure 1 by means of a compression spring 47, confined between the collar 48, secured to the outer end of the valve stem or rod, and the follower 49 that forms part of the bushing for preventing the escape of lubricant along the valve rod. For reciprocating the valve rod 45, I provide the push rod 50 that extends through the instrument board 51 and the inner end of which extends loosely into a socket 52 formed in the outer end of the valve rod 45. The outer end of the push rod is provided with a thumb piece 52'. A compression spring 53, confined between the instrument board 51 and the collar 54, provides means for yieldingly holding the inner end of the push rod in the socket 52. A pin 55, extending through the push rod, prevents movement of the collar 54 longitudinally of the push rod 50.

The operation of my improved lubricating system is as follows: When the motor is operating, the shaft is, of course, in rotation and its motion is communicated to the pump 19, which may be of the conventional gear type. This pump withdraws lubricant from the crank case and forces it through the conduit 21, the passageway 24 and the conduit 22 back to the crank case. In this manner, as long as the valve 41 remains in the position shown in Figure 3, the lubricant will circulate in the path just described, although, as shown in the drawings, it is possible for the lubricant to be forced down to the bearings. The resistances of the bearings are, ordinarily considerably greater in magnitude than the resistances to the passage of oil through the circuit, or path, just described, and consequently, insufficient pressure will be developed to force the lubricant into the bearings.

If, however, the operator pushes inwardly upon the thumb piece 52', until the shoulder 44 encounters the stop screw 56, passage of the oil through the passageway 24 will be prevented and the oil will be diverted through the port 28, the filter chamber 27, the filter unit and into the passageway 25 and from thence out through the conduits 39 and 40 to the bearings to be lubricated. When the operator releases the pressure upon the thumb piece 52', the valve will return to the position shown in Figure 3, because the tension of the spring 47 is made greater than the tension of the spring 53. The outward movement of the valve is limited by the engagement of the shoulder 43 with the stop screw 57.

Stuffing boxes 58, 59, 60, 61, 62 and 63, of conventional design, may be used for preventing leakage at the various connection points. Suitable brackets 64 and bolts 65 may be used for mounting the control valve V upon the dash board 46.

From the above description it will be seen that while I provide means for maintaining a constant circulation of oil from and to the crank case, only that portion of the oil that is supplied to the bearings passes through the filter. In this manner, I prevent the rapid fouling of the filter that would take place if I should attempt to provide means for filtering all of the circulating oil.

It will also be noted that I have provided a balanced valve arrangement that enables the operator easily to position the valve so as to cause the passage of oil to the various bearings that are to be lubricated. By mounting the control valve in advance of the dash board, I prevent the drippage of oil through the space that is usually occupied by the feet of the passengers riding on the front seat, and by making the valve stem in two parts, that can be easily and quickly separated, I have provided means that permit the easy and quick installation of the control valve unit.

It will, of course, be understood that any number of conduits may lead from the control valve unit to as many bearings as it may be desired to lubricate. Where the resistances of the various bearings are subshtantially equal, a simple connection with each of the bearings will suffice, but where there is marked differences between the resistances of the various bearings, it will be advisable to place resistances, or obstructions, in the various conduits or make use of measuring valves, or devices, all of which are well known to those skilled in this art, for apportioning the oil to the various bearings.

The filter element is positioned so that it can be easily and quickly removed and replaced by a new filter element in the event, through continued usage, it becomes clogged with matter separated from the oil passing therethrough.

While I have described the details of construction of a preferred embodiment of my invention, it is to be clearly understood that my invention is not limited to these details, but is capable of other adaptations and modifications within the scope of the appended claims.

Having thus described my invention, what I claim is:

1. The combination with an automotive vehicle comprising a bearing, and an engine having a crank case, of a pump for receiving oil from said crank case, a body member having a longitudinal bore and two transversely extending bores communicating with each other and with said longitudinally extending bore, one of said transversely extending bores being enlarged to form a filter chamber, a filter for filtering the oil passing through said filter chamber, conduits for connecting the ends of one of said transversely extending bores with said oil pump and said crank case respectively, another conduit for connecting the discharge end of the other transversely extending bore with said bearing, a balanced valve slidable in said longitudinally extending bore for obstructing one of said transversely extending bores to cause oil to pass through said filter and into said bearing, and means for reciprocating said valve.

2. The combination with an automotive vehicle comprising a bearing and an engine having a crank case, of a pump for receiving oil from said crank case, a body member having a longitudinal bore and two transversely extending bores communicating with each other and with said longitudinally extending bore, one of said transversely extending bores being enlarged to form a filter chamber, a filter for filtering the oil passing through said filter chamber, conduits for connecting the ends of one of said transversely extending bores with said oil pump and said crank case respectively, another conduit for connecting the discharge end of the other transversely extending bore with said bearing, and a valve for obstructing one of said transversely extending bores to cause oil to pass through said filter and into said bearing.

3. The combination with an automotive vehicle comprising a bearing and an engine having a crank case, of a pump for receiving oil from said crank case, a body member having a longitudinal bore and two transversely extending bores communicating with each other and with said longitudinally extending bore, a filter for filtering the oil passing through one of said transversely extending bores, conduits for connecting the ends of one of said transversely extending bores with said oil pump and said crank case respectively, another conduit for connecting the discharge end of the other transversely extending bore with said bearing, and a valve for obstructing one of said transversely extending bores to cause oil to pass through said filter and into said bearing.

4. The combination with an automotive vehicle comprising a bearing to be lubricated and an engine having a crank case, of means for withdrawing oil from said crank case and supplying it to said bearing comprising a pump having its intake connected with said crank case, a body member having two bores extending therethrough, said bores having a common intake port communicating with the discharge port of said pump, a conduit connecting the discharge port of one of said bores with said crank case, a second conduit connecting the discharge port of the other of said bores with said bearing, said last named bore being enlarged intermediate its ends to form a filter chamber, a filter for filtering the oil passing through said chamber and a manually operable valve for causing the oil to pass through one, or the other, of said ports.

5. The combination with an automotive vehicle comprising a bearing to be lubricated and an engine having a crank case, of means for withdrawing oil from said crank case and supplying it to said bearing comprising a pump having its intake connected with said crank case, a body member having two bores extending therethrough, said bores having a common intake port communicating with the discharge port of said pump, a conduit connecting the discharge port of one of said bores with said crank case, a second conduit connecting the discharge port of the other of said bores with said bearing, a filter for filtering the oil passing through said last named bore, and a valve for causing the oil to pass through one, or the other, of said ports.

In witness whereof, I hereunto subscribe my name this 21st day of July, 1925.

OSCAR ULYSSES ZERK.